(12) United States Patent
Rapin (10) Patent No.: US 8,916,044 B2
(45) Date of Patent: Dec. 23, 2014

(54) FILTER ELEMENT WAVE GLAND SEAL

(75) Inventor: Daniel P. Rapin, Schoolcraft, MI (US)

(73) Assignee: Parker-Hannifin Corporation, Cleveland, OH (US)

( * ) Notice: Subject to any disclaimer, the term of this patent is extended or adjusted under 35 U.S.C. 154(b) by 240 days.

(21) Appl. No.: 13/305,894

(22) Filed: Nov. 29, 2011

(65) Prior Publication Data

US 2012/0181224 A1    Jul. 19, 2012

Related U.S. Application Data

(60) Provisional application No. 61/433,611, filed on Jan. 18, 2011.

(51) Int. Cl.
| | | |
|---|---|---|
| *B01D 35/30* | (2006.01) | |
| *B01D 35/153* | (2006.01) | |
| *B01D 29/13* | (2006.01) | |
| *B01D 29/15* | (2006.01) | |
| *B01D 29/96* | (2006.01) | |
| *B01D 29/21* | (2006.01) | |

(52) U.S. Cl.
CPC .......... *B01D 35/153* (2013.01); *B01D 2201/34* (2013.01); *B01D 2201/4046* (2013.01); *B01D 2201/295* (2013.01); *B01D 2201/296* (2013.01)
USPC .......... 210/232; 210/235; 210/236; 210/435; 210/437; 210/440; 210/443; 210/450; 210/455; 210/457; 210/493.2

(58) Field of Classification Search
None
See application file for complete search history.

(56) References Cited

U.S. PATENT DOCUMENTS

| | | |
|---|---|---|
| 2,418,777 A | 4/1947 | LeClair |
| 4,786,409 A | 11/1988 | Miller |
| 5,171,043 A | 12/1992 | Ronda et al. |

(Continued)

FOREIGN PATENT DOCUMENTS

| | | |
|---|---|---|
| DE | 100 52 524 A1 | 4/2002 |
| WO | 2006/012031 A1 | 2/2006 |
| WO | 2009/012010 A1 | 1/2009 |
| WO | 2010117799 A2 | 10/2010 |

OTHER PUBLICATIONS

Demand for International Preliminary Examination, dated Sep. 3, 2012, mailed to the European Patent Office in corresponding International Patent Application No. PCT/US2012/020697 by Urquhart, Dykes & Lord LLP.

(Continued)

*Primary Examiner* — Benjamin Kurtz
(74) *Attorney, Agent, or Firm* — Christopher Hunter (57) ABSTRACT

A filter module includes a filter element with a ring of media and an end cap at one end of the ring. The end cap includes an annular body with a sealing member located around a surface of the body circumscribing a central opening, wherein the sealing member has a repeating, undulating, non-planar geometry. The axial, distal end of the annular body also has an repeating, undulating non-planar geometry, matching the geometry of the sealing member, and can have one or more tabs projecting axially outward from the distal end, positioned at a point of maximum amplitude of the distal end, and which are received in cooperating slots formed in a socket of a diaphragm, to facilitate positioning and installing the element into the module. The socket includes an outer wall having a matching non-planar geometry which receives and seals against the sealing member on the end cap.

29 Claims, 8 Drawing Sheets

(56) References Cited

U.S. PATENT DOCUMENTS

| | | |
|---|---|---|
| 6,283,305 B1 | 9/2001 | Maeda et al. |
| 6,675,995 B2 | 1/2004 | Stull et al. |
| 6,949,189 B2 * | 9/2005 | Bassett et al. .................. 210/234 |
| 7,494,017 B2 | 2/2009 | Miller |
| 7,540,956 B1 | 6/2009 | Kurth et al. |
| 8,603,334 B2 | 12/2013 | Stamey, Jr. et al. |
| 2003/0038088 A1 | 2/2003 | Denys et al. |
| 2004/0103626 A1 | 6/2004 | Warth et al. |
| 2008/0142426 A1 * | 6/2008 | Greco et al. .................. 210/234 |

OTHER PUBLICATIONS

International Preliminary Report on Patentability, dated Jan. 21, 2013 in corresponding International Patent Application No. PCT/US2012/020697.

Notification of Transmittal of the International Search Report and the Written Opinion of the International Searching Authority, or the Declaration, mailed Mar. 21, 2012 in corresponding International Application No. PCT/US2012/020697.

\* cited by examiner

FILTER ELEMENT WAVE GLAND SEAL

FIELD OF THE INVENTION

The present invention relates generally to filter elements and filter modules, and to the interface between the element and a corresponding mating component.

In some filtration applications, a replaceable filter element has an end cap which is connected to the head of a filter module. The module includes a canister which receives the element, and inlet and outlet ports in the head which direct fluid into and out of the module. The fluid passes through the filter element, which separates particles and other contaminants from the fluid which is then returned to the operating system. In order for the filter element to properly function and not leak, a positive seal must be maintained with the filter head. Typically, hydraulic filter elements use an O-ring supported along a plane in a straight cut or radial seal gland design. A sloped or angled seal gland design has been used, for example as shown in U.S. Pat. No. 7,494,017 for "Filter Element With Off-Axis End Cap", issued to the assignee of the present invention.

SUMMARY OF THE INVENTION

A filter element is provided which includes an end cap having an annular body defining an opening into a central cavity of the element, and a sealing member circumscribing the body. According to one embodiment, the sealing member is located in a groove formed along a radially outer surface of the annular body, and has a non-planar geometry such as a repeating, undulating, multi-lobed geometry.

An axial, distal end of the filter element end cap also has a non-planar geometry, substantially matching the geometry of the sealing member.

The annular body of the filter element is closely received within a socket formed in a diaphragm in the head of the filter module, with the distal end of the end cap body fitting flush against a complementary undulating surface along a shoulder internal to the socket. The socket has an outer wall with an undulating end surface matching the undulating geometry of the sealing member, and an axial extent such that the wall sufficiently covers the sealing member around the entire circumferential extent of the end cap to provide a fluid-tight seal between the annular body of the filter element and the diaphragm.

The undulating geometry of the distal end of the end cap can have an amplitude, chosen such that when the element and diaphragm are out of alignment, a sufficient gap is provided to prevent the canister from being fully threaded onto the head; or if the gap is large enough, even to prevent the threads on the canister and head from inter-engaging. In other words, the canister cannot be properly screwed onto the head when the element is out of rotational alignment with the diaphragm, as the expanded element/diaphragm interface prevents the canister from being tightened-down. This can provide a visual cue that the element is not properly located within the module, or that an incorrect element is present.

The annular body can have one or more tabs projecting axially outward from the distal end, which can be positioned at the points of maximum amplitude of the distal end. The tabs along the distal end of the end cap body are received in slots in the shoulder of the socket, which can be positioned at the points of minimum amplitude along the surface of the shoulder. Alternatively the tabs and slots could be reversed, with the tabs on the diaphragm and the slots in the end cap. Either way, the tabs and slots further facilitate positioning and installing the element in the socket.

Advantages of the present invention include good seal retention in the undulating groove of the end cap; rapid in-phase engagement between the end cap and socket during assembly; and a robust, positive seal between the end cap and the socket even during high differential pressures across plugged media.

DETAILED DESCRIPTION OF THE PREFERRED EMBODIMENT

Figure 1:
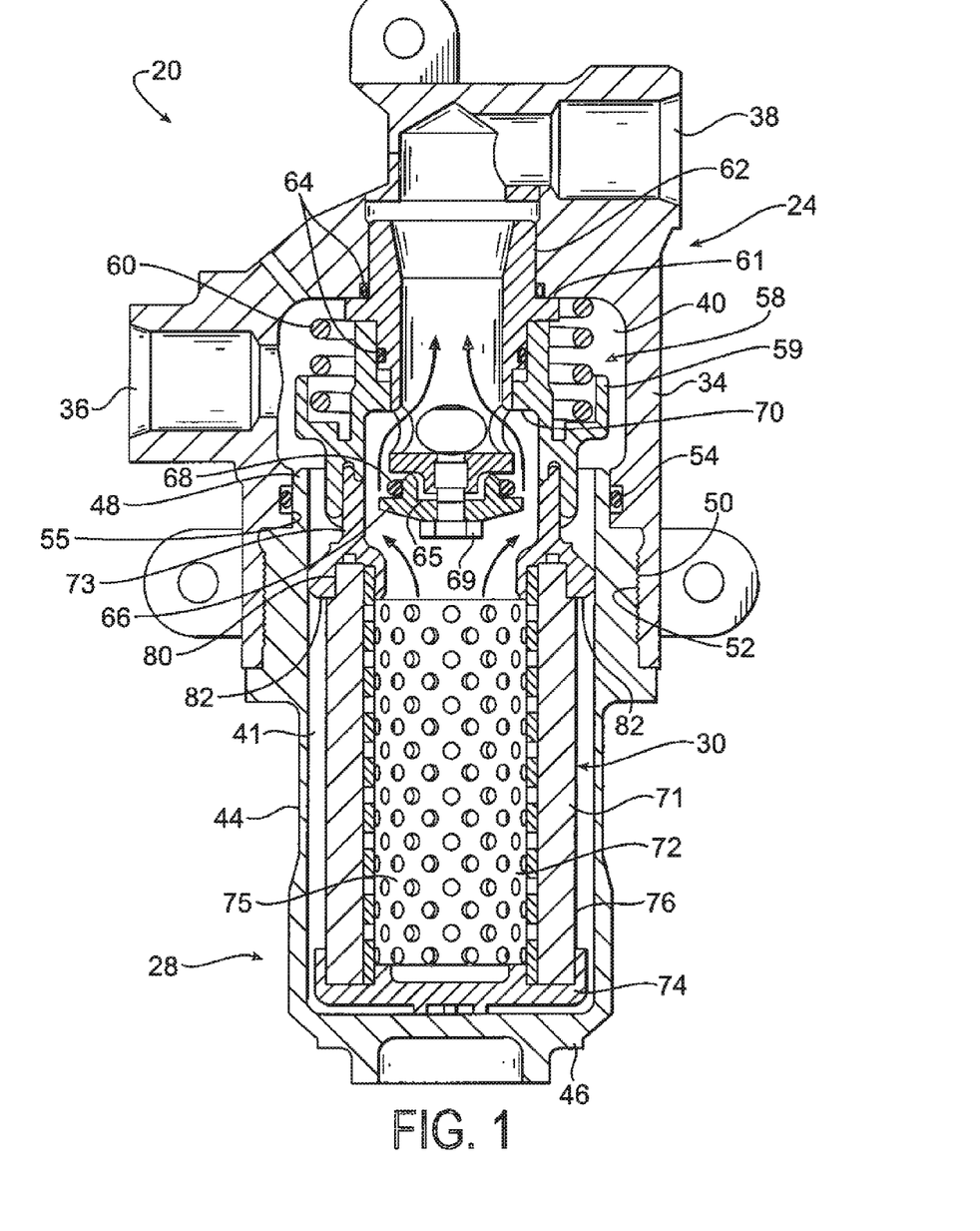
FIG. 1 is a cross-sectional side view of a filter module constructed according to the present invention, with the valve assembly in an open condition.

Referring to the Figures, and initially to FIG. 1, a filter module constructed according to the present invention is shown generally at 20. Filter module 20 can be used in a variety of applications, for example, hydraulic filter applications, where it is necessary or desirable to remove particulate and/or other contaminants from a hydraulic fluid stream. Module 20 generally includes a head assembly, indicated generally at 24, a cup-shaped bowl or canister, indicated generally at 28, and a filter element, indicated generally at 30, which is received and supported in bowl 28 and removes the contaminants and particulate in the fluid stream as it passes therethrough.

The head assembly 24 of the module includes a body 34 with an inlet port 36 which can be connected to receive fluid to be filtered from the system, and an outlet port 38 which can be connected to direct filtered fluid back to the system. Inlet port 36 directs incoming fluid into an inlet cavity 40 in the body where it can pass into a peripheral region 41 between the exterior of the element and the interior of the canister, as will be described in greater detail below. Body 34 can be formed in one or more pieces from any material appropriate for the particular application, such as metal; in any appropriate manner such as by die-casting and/or machining.

Canister 28 includes a sidewall 44, a closed end 46, and an open end 48. The open end 48 of the canister has a threaded exterior portion as at 50 which cooperates with a threaded interior portion 52 of body 34 of the filter head to enable the canister to be screwed onto and off of the head. Canister 28 can likewise be formed in one or more pieces from any material appropriate for the particular application, such as metal; in any appropriate manner such as by die-casting and/or machining. An appropriate seal such as at 54, supported within a groove in a land area 55 of body 34, can be provided between canister 28 and body 34 to ensure a fluid-tight connection when the canister and body are assembled together.

Head assembly 24 can further include a valve assembly, as at 58. Valve assembly 58 includes a diaphragm member 59, and a compression spring 60 which extends between the diaphragm member 59 and an upper, inside surface of the cavity 40. Diaphragm member 59 is slidingly supported on an adapter 61; while itself is retained within a neck portion 62 of body cavity 40 by cooperating threaded portions or other appropriate attachment techniques.

Appropriate O-ring gaskets as at 64 are provided between the adapter 61, diaphragm member 59 and body 34 as appropriate to prevent fluid leakage therebetween. Diaphragm member 59 is normally supported in an open position away from the distal open end 48 of the canister when a filter element 30 is located within the canister, and the canister is fully screwed onto the filter head, as illustrated in FIG. 1, to allow fluid flow from inlet 36 into the peripheral region 41 of the canister.

Valve assembly 58 further includes a seal assembly 65 supported internally of the lower, inner end of the adapter. Seal assembly 65 includes a stop collar 66, O-ring seal 68 supported around the periphery of the collar 66 and providing a seal against the surrounding adapter, and bolt 69 which retains the collar 66 together within the adapter. The diaphragm member 59 is likewise normally retained in a spaced-apart position from the seal assembly due to engagement by the upper end cap of the filter element when the canister is fully screwed onto the filter head, to allow filtered fluid to pass out from the canister and be directed to the outlet port 38.

Figure 14:
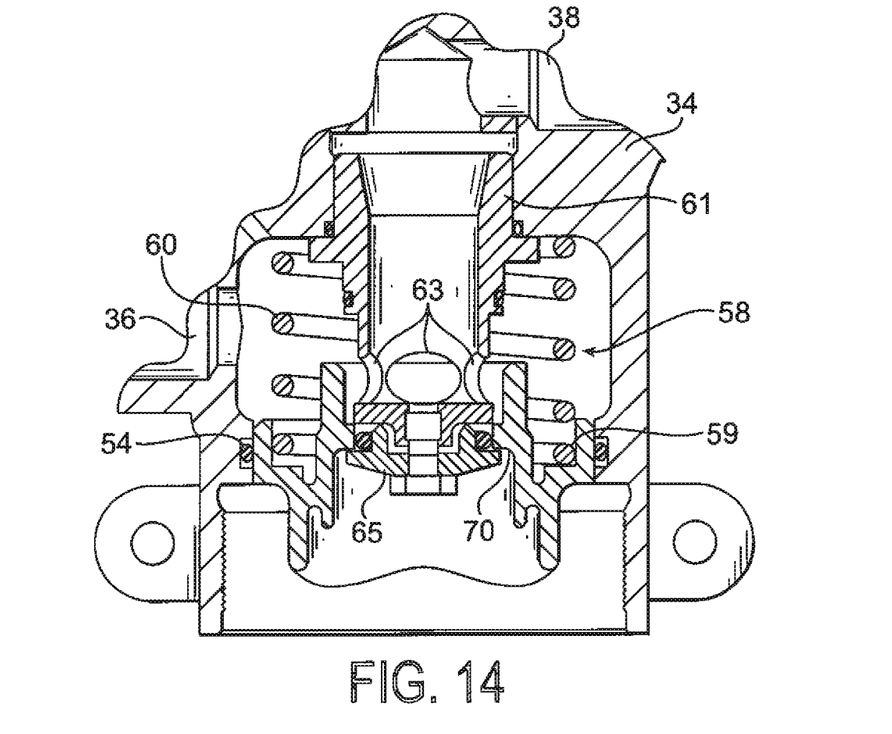
FIG. 14 is a cross-sectional side view of the filter module of FIG. 1, illustrating the valve assembly when the canister is removed.

If the canister is removed, such as to access and replace a spent filter element, the diaphragm member 59 is biased by compression spring 60 downwardly and internally within land area 55 of body 34 into a sealed and closed position by virtue of seal 54, as shown in FIG. 14. As the diaphragm member 59 moves into the closed position, an inner annular shoulder 70 of the diaphragm member simultaneously engages and seals against the seal assembly 65. Thus as should be apparent, valve assembly 58 completely closes the open end of the filter head when the canister is removed, to prevent fluid from leaking out of the head assembly.

Figure 2:
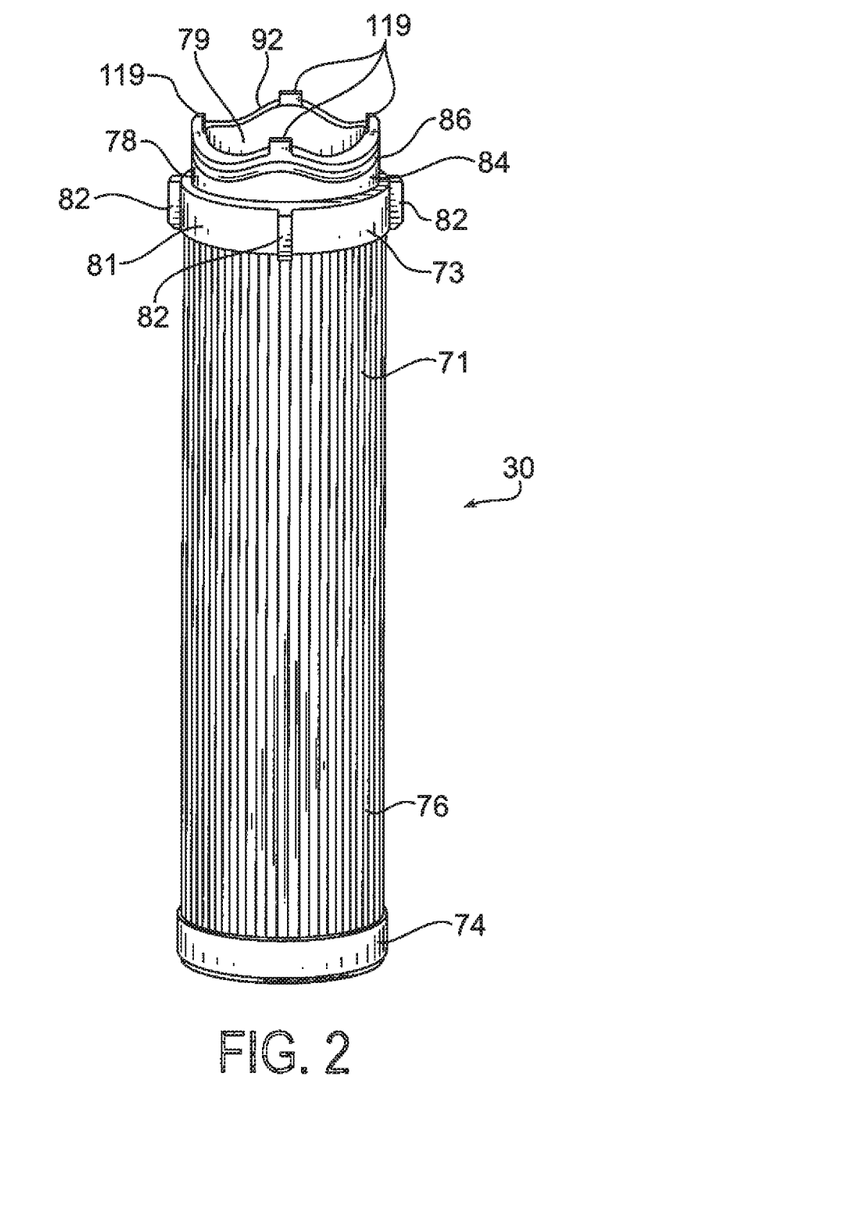
FIG. 2 is an elevated perspective view of a filter element for the module of FIG. 1, with the sealing member removed for clarity.

Referring now also to FIG. 2, filter element 30 includes a ring of filtration media 71 circumscribing a central axis and defining a central cavity 72, an upper end cap 73 at one end of the media ring, and a lower end cap 74 at the opposite end of the media ring. Media ring 71 can be formed any material appropriate for the particular application, and can be formed in any appropriate manner, such as by pleating. In some hydraulic filtration applications, the media ring will include a multi-layered pleated structure including a central perforated support core 75 and an outer support mesh 76, for additional support of the media during high pressure differentials and flow. End caps 73, 74 can likewise be formed in one or more pieces of any material appropriate for the particular application, for example, a hard, strong, chemically-resistant polymer, and formed using any appropriate technique, such as molding.

Figure 3:
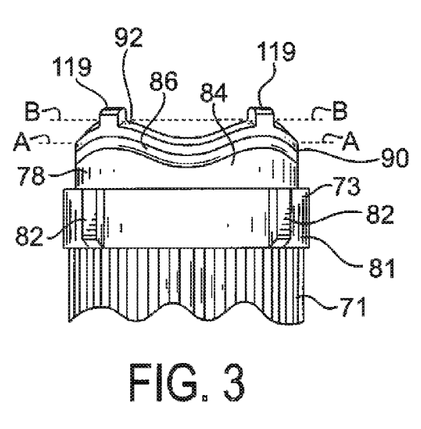
FIG. 3 is a side view of a portion of the filter element and upper end cap, the element and end cap having the same view when rotated in subsequent ninety degree increments.
Figure 4:
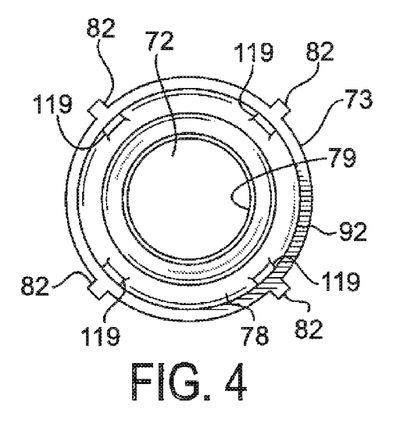
FIG. 4 is a top plan view of the filter element.
Figure 5:
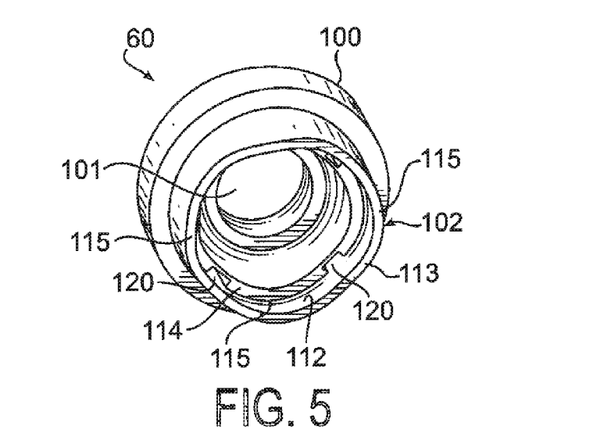
FIG. 5 is a perspective view from the bottom of the diaphragm.
Figure 6:
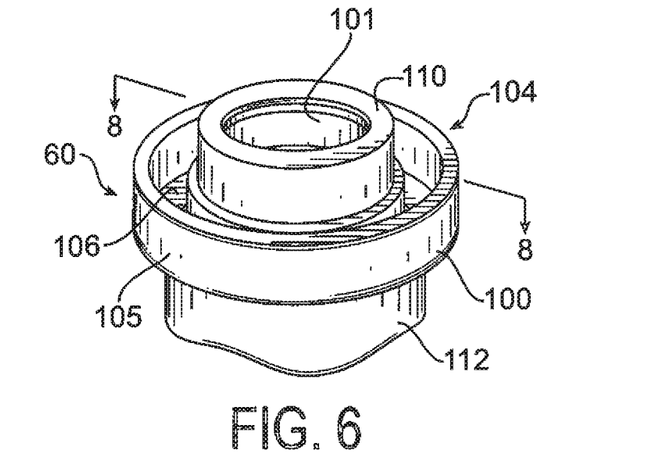
FIG. 6 is a perspective view from the top of the diaphragm.
Figure 7:
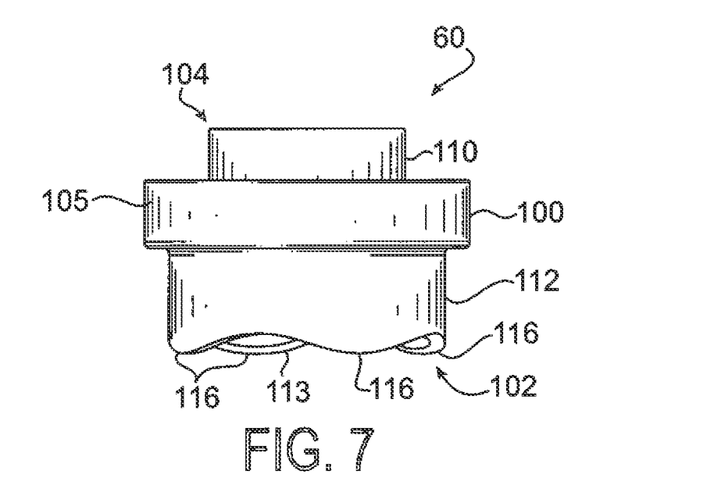
FIG. 7 is a side view of the diaphragm.
Figure 8:
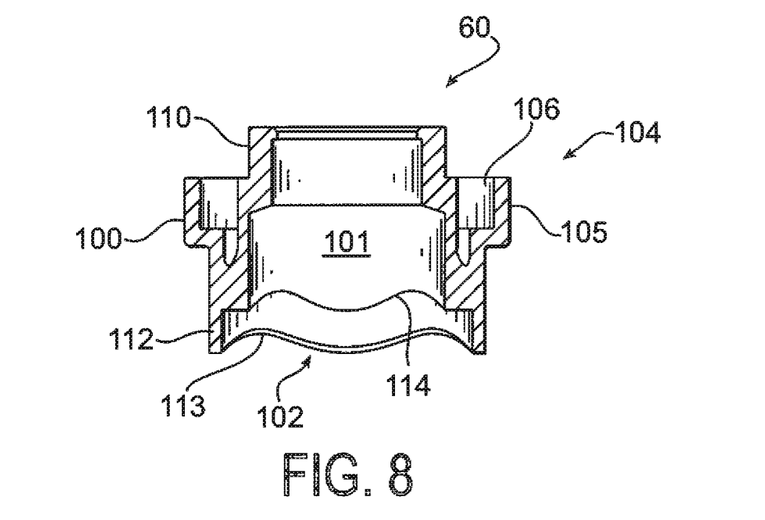
FIG. 8 is a cross-sectional side view of the diaphragm, taken substantially along the plane defined by the lines 8-8 in FIG. 6.
Figure 9:
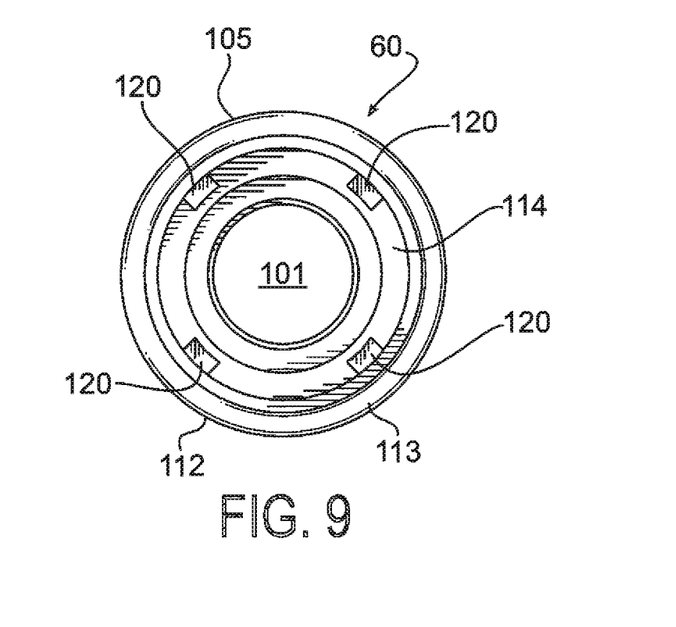
FIG. 9 is a bottom plan view of the diaphragm.

Referring now also to FIGS. 3 and 4, the upper end cap 73 includes an annular body 78 circumscribing a central opening 79 into the cavity 72 of the filter element. Body 78 includes a channel 80 (FIG. 1) in an inner end, which receives the end of the media ring 72 and support core 75. The end cap 73 is affixed in an appropriate manner, such as with adhesive or potting compound, to the media ring 72. End cap 73 further includes an enlarged annular base 81 having series of radially-outward projecting centering tabs as at 82, spaced equally around the peripheral circumference of the end cap and extending axially along the length of the annular base 81. Tabs 82 provide a stand-off gap between the end cap 73 and the inside surface of the canister 44 to properly orient and center the element when the element is located within the canister (see FIG. 1); while still allowing fluid flow from inlet 36 through the gaps between the tabs into the peripheral region 41. While four such tabs are illustrated, the number, geometry and spacing of the tabs can vary, as should be appreciated.

The body 78 of the end cap further includes an outer annular surface 84 having a channel or groove 86. Groove 86 can have a smoothly undulating, non-planar geometry, for example of a generally sinusoidal shape, repeating around the circumference of the body. Groove 86 can have a number of lobes equally spaced around the circumference of the body, that is, wave peaks or locations of maximum amplitude, around the circumference of the body. Four such lobes are illustrated in FIG. 2, however the number, spacing and geometry of the lobes can vary, as can the undulating geometry of the groove, as will be explained below. Only a single lobe may be necessary in certain applications.

As shown in FIG. 3, a sealing member 90 is located in groove 86 and substantially assumes the geometry of the groove. Sealing member 90 can be a standard elastomeric O-ring, although more complicated structures, such as an undulating shape substantially matching the shape of the groove, can also be used. The sealing member can have a diameter substantially the same as the width of the groove 86; while the depth of the groove is slightly shallower, such that the sealing member projects slightly outwardly from the groove for sealing against an opposing surface. The sealing member has a diameter such that it somewhat stretches when it is installed within the groove, to facilitate retention.

Alternatively, sealing member 90 can be formed unitarily with the end cap, such as by incorporating a resilient or flexible sealing material into the mold for the end cap. In such case, of course, only the sealing member will have the undulating shape described above and there would not be a separate groove. In addition, as described above, the seal gland is located on the outside diameter of the end cap body 78, which provides good O-ring retention during replacement operations. Alternatively, the seal could likewise be supported internally of the body 78 such as in a groove or channel. The reasons for the location and geometry of the sealing member will be further described below.

The distal outer end 92 of body 78 runs proximate the groove 86 (or sealing member 90) and can have a similar geometry. That is, the outer end 92 can have an edge or surface with the same undulating, non-planar geometry described above with respect to the groove 86 (and sealing member 90), in-phase and with the same amplitude.

Referring now to FIGS. 5-8, the diaphragm member 60 for the valve assembly 58 is illustrated, and includes an annular body 100 surrounding a central passage 101, and including a socket portion indicated generally at 102 and a valve portion indicated generally at 104. The valve portion 104 of the diaphragm includes an enlarged annular flange 105 circumscribing the body 100 and spaced apart therefrom to define an internal annular channel or groove 106 dimensioned to receive the end of compression spring 60. The lower annular shoulder of flange 105 forms a valve member, which as described previously, is sealed against seal 54 when the canister is removed from the head and the diaphragm member slides internally of body 34 due to compression spring 60. Flange 105 can have lead-in chamfers on the upper and lower outer edges of the flange to facilitate movement of the diaphragm member within the body 34 and seal 54. An annular sleeve 110 projects axially upward from the body 100 and is dimensioned to slidingly receive the adapter 61, as in FIG. 1.

Figure 11:
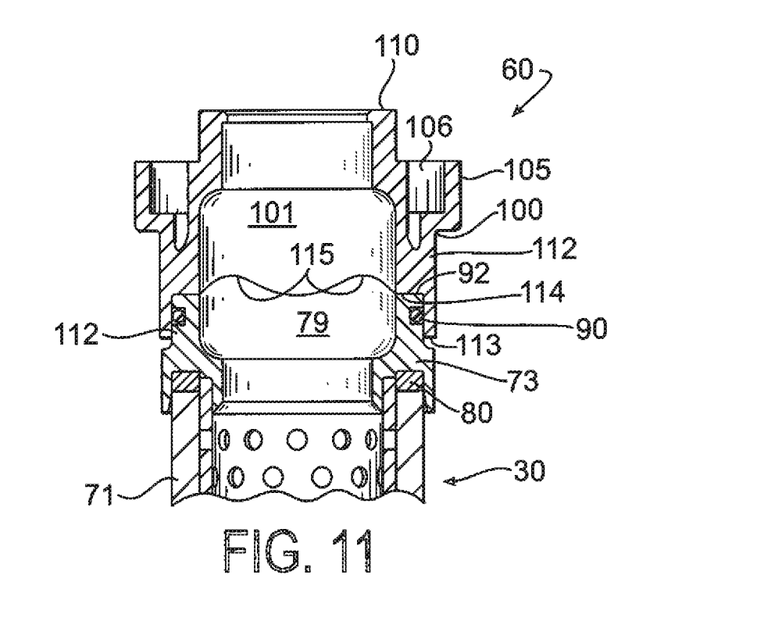
FIG. 11 is a cross-sectional side view of the element and diaphragm, taken substantially along the plane defined by the lines 11-11 of FIG. 10.

The lower, socket portion 102 of the diaphragm includes an outer annular wall 112 which projects downwardly from the body 100 and terminates in a distal end 113; and an internal annular shoulder 114, inwardly circumscribing the wall and facing the lower outer end of the diaphragm. The shoulder 114 has a smoothly undulating, non-planar geometry, of a generally sinusoidal shape, repeating around the circumference of the body, and substantially matching the undulating geometry of the distal end 92 of the end cap body 78, such that the end cap body can be located in substantial surface-to-surface engagement against the shoulder, as illustrated in FIG. 11. As with the end cap body, the shoulder 114 can have a number of equally-spaced lobes as at 115, that is, wave peaks, around the circumference of the body. The number, spacing and geometry of the lobes can vary depending upon the corresponding lobes formed in the end cap to achieve flush, surface-to-surface engagement, and enable rapid rotational alignment of the end cap relative to the socket.

Figure 10:
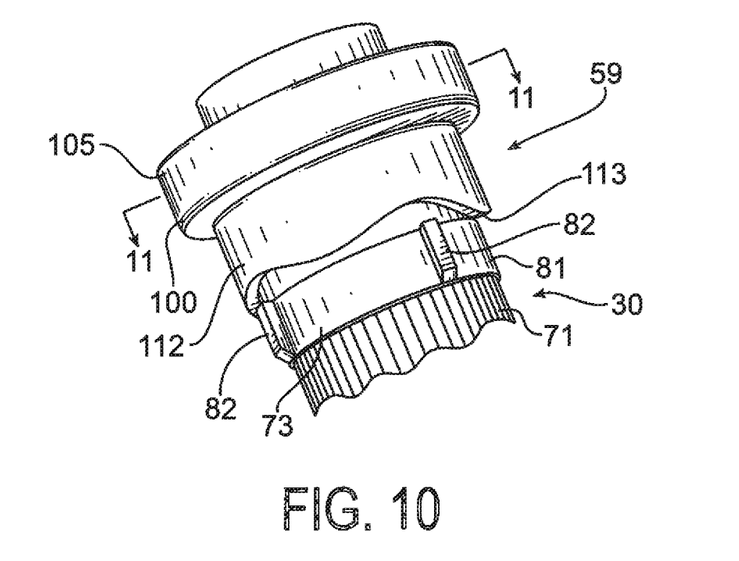
FIG. 10 is an elevated perspective view showing a portion of the element assembled with the diaphragm.

The annular wall 112 closely receives the body 78 of the end cap, and can have a lead-in chamfer to facilitate insertion over the sealing member 90 on the end cap. The distal end 92 of the end cap 73 can likewise have a lead-in chamfer to facilitate assembly with the diaphragm member. The distal end 113 of the wall can also have the repeating, undulating, non-planar geometry matching the geometry of the shoulder 114, including matching the undulations in phase and amplitude and having lobes 116 substantially matching lobes 115 in shoulder 114. Wall 112 has an axial extent sufficient to cover at least a major portion of the sealing member 90, that is, it extends at least sufficiently across sealing member 90 to prevent fluid leakage between the end cap and diaphragm, when the end cap is properly rotationally oriented within the diaphragm. FIG. 10, for example, illustrates the wall 112 having an axial extent completely covering the sealing member 90 and groove 86 when the end cap and diaphragm are in-phase with each other.

Figure 15:
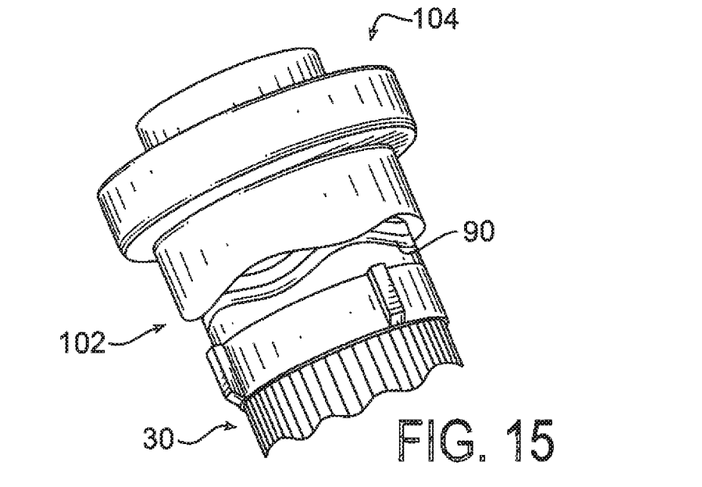
FIG. 15 is a side perspective view of the filter element and diaphragm, illustrating the element and diaphragm rotationally misaligned with one another.

When the element is properly in-phase with the diaphragm socket, such that the opposing undulating surfaces of end cap edge 92 and shoulder 114 are in surface-to-surface engagement, in-phase with each other, the side wall 112 seals along the entire extent of the sealing member 90 and a fluid-tight seal is provided between the end cap and the diaphragm. The interface establishes a linear load path between installed components during highly compressive states encountered during elevated differential pressure conditions. In contrast, referring to FIG. 15, should the element 30 be out-of-phase with the socket 102, the sealing member 90 will not fully seal against the inside surface of the socket, and a leak path will occur. The complementary geometries improve the positive engagement between the element end cap and diaphragm, improve the structural properties of both the element end cap and diaphragm during highly loaded conditions, and aides in the element assembly process. The slope of the lobes in the multi-lobe design provides good in-phase engagement between the element end cap and diaphragm during element replacement.

During element replacement, a fresh element can be located in any rotational orientation in the canister, and the canister is then threaded onto the filter head. Referring again to FIG. 1, as the canister is tightened, the end cap 73 of the element engages and pushes upwardly against the diaphragm and valve assembly, which is resisted by compression spring 60. The compression spring loads the element axially and causes the element to rotate into a neutral position, or in other words, into a position where the opposing surfaces of the end cap edge 92 and inner shoulder 114 are in-phase and in surface-to-surface alignment. As should be appreciated, with the illustrated four lobe design, the element only needs to be rotated ninety degrees until the opposing surfaces of the end cap edge 92 and the shoulder 114 are flush with one another. Should a two-lobe design be used, the element would be rotated one hundred eighty degrees to sit properly. A single lobe design would require up to a three hundred and sixty degree rotation to sit properly. Appropriate rotation for other lobe designs can be easily calculated. It is noted that non-planar geometries other than a lobe design could alternatively, or in addition, be used that would cause the element to be properly indexed and aligned with respect to the diaphragm. After the element is properly rotationally-oriented, the canister can be fully threaded onto the filter head and the system returned to operation.

The undulating geometry of the distal end 92 of the end cap 73 can be considered to have an amplitude along the axial direction, from a minimum amplitude "A" closest to the base 81—to a maximum amplitude "B" at the point farthest from the base, as illustrated in FIG. 3. The undulating geometry of groove 86, and hence seal 90, likewise has the same maximum and minimum amplitudes. The amplitude and the dimensions of the element and canister can be chosen such that when the element and diaphragm are out of alignment, a sufficient gap is provided to prevent the canister from being fully threaded onto the head; or if the gap is large enough, even to prevent the threads on the canister and head from inter-engaging. In other words, the canister cannot be properly screwed onto the head when the element is out of rotational alignment with the diaphragm, as the expanded element/diaphragm interface prevents the canister from being tightened-down. If the geometry of the end cap and of the canister are chosen appropriately to create such a gap, this can provide a visual cue that the element is not properly located within the module, or that an incorrect element is present. FIG. 3 illustrates an amplitude where the lowest point of the distal end, in the trough of their respective lobes, is co-planar with the highest point of the groove, at the apex of their respective lobes (that is, an imaginary plane perpendicular to the axis of the element would intersect these points); however as should be appreciated, this can vary depending upon the particular dimensions and geometry of the element and canister.

To facilitate installing and locating the element, a series of keyway tabs 119 can optionally be provided around the end 92 of the end cap. Tabs 119 project axially outward, away from the end of the body 78 of the end cap, and can also have a lead-in chamfer to facilitate assembly with the diaphragm member. As shown in FIGS. 2-4, each tab can be located generally at the apex of a lobe, or point of maximum amplitude, and as such, are generally also evenly-spaced around the end cap. Tabs 119 can be formed unitary (in one piece) with the end cap, or can be formed as separate piece(s) and is affixed (such as with adhesive) or otherwise supported against the end cap.

The diaphragm can likewise optionally include a series of slots as at 120 formed in the shoulder 114 of the diaphragm. The slots 120 are formed at the points of minimum amplitude of the shoulder, or in other words, at the low point of the wave geometry of the shoulder. The slots are dimensioned to receive the keyway tabs 119 in the end cap, to facilitate locating the end cap properly in-phase with the socket. Four slots 120 are illustrated which will receive four tabs 119 from the end cap—however the location, geometry and number of tabs and slots can vary. When the element is properly rotated with respect to the socket and in-phase therewith, the tabs are received within the slots and the element fits tightly within the socket ensuring positive engagement, as shown in FIG. 11. Again, in such case the outer wall 112 of the socket covers the sealing member 90, and a fluid-tight seal is provided between the end cap and the diaphragm.

When the end cap is out-of-phase with the socket (FIG. 15), the tabs 119 in the end cap ride against the surface of the diaphragm shoulder 114. This creates an even greater gap between the element end cap and diaphragm, and hence further facilitates preventing the canister from being properly screwed into the head, and thereby further facilitates the visual inspection of the filter assembly for an incorrect element.

As indicated above, the sealing member 90 in the end cap could be likewise located along the inside diameter of the end cap body 78. In such case, the socket 60 could have a wall configured to fit centrally within the end cap—rather than having a central cavity receiving the end cap. The remainder of the socket, such as the shoulder, tabs and slots could be the same as in the embodiment described previously, to ensure a robust, fluid-tight seal between the end cap and socket, and to facilitate assembly and installation. Also, it should be noted that the socket and end cap are described above as having complementary annular or circular configurations. It is possible that these members could have cooperating configurations other than round, such as oval, star-shaped, square, etc.

Figure 12:
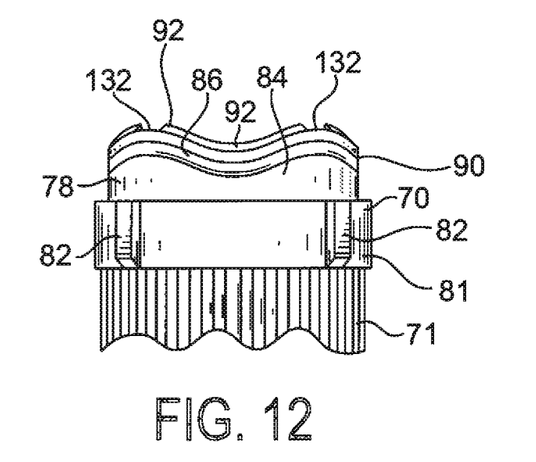
FIG. 12 is a side view of a portion of the filter element and upper end cap, according to a second embodiment of the present invention.
Figure 13:
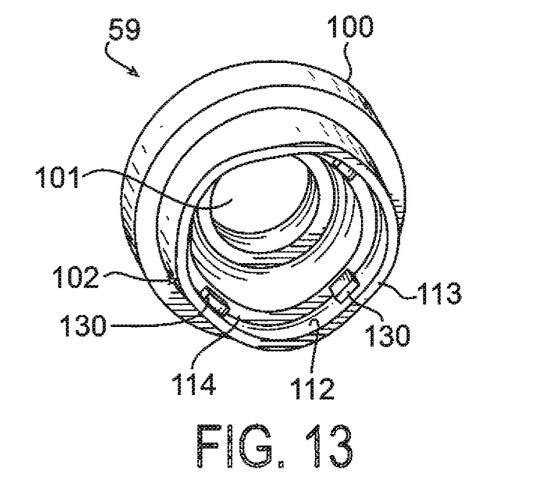
FIG. 13 is a perspective view from the bottom of the diaphragm, according to a second embodiment.

A further embodiment of the present invention is illustrated in FIGS. 12 and 13. In this embodiment, the key way tabs are indicated at 130, and are instead provided internal of the socket portion 102 of the diaphragm member, while the receiving slots, indicated at 132, are located in the end 92 of the end cap. The diaphragm and element fit together in the same way and are in other respects the same as described previously.

As should be appreciated from the above, some advantages of the present invention include good seal retention in the undulating groove of the end cap; rapid in-phase engagement between the end cap and socket during assembly; and a robust, positive seal between the end cap and the socket even during high differential pressures across plugged media.

The principles, preferred embodiments and modes of operation of the invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A filter element including a ring of filtration media circumscribing a central axis and defining a cavity, and an end cap at an end of the media ring; the end cap including a body defining an opening into the cavity and having a distal outer end with a repeating, undulating, non-planar geometry around the body, and further including a sealing member along a radially outer surface of the body, the sealing member also having a non-planar geometry around the distal end of the end cap body.

2. The filter element as in claim 1, wherein the distal outer end of the body has an undulating, repeating axial amplitude around the body.

3. The filter element as in claim 1, wherein the outer end geometry includes at least one lobe spaced around the body.

4. The filter element as in claim 3, wherein the outer end geometry includes multiple lobes around the body.

5. The filter element as in claim 4, wherein the multiple lobes are equally-spaced around the body.

6. The filter element as in claim 5, wherein the distal end of the body has multiple tabs projecting axially outward from the distal end, each tab being located at a point of maximum amplitude on the distal end.

7. The filter element as in claim 1, wherein the distal end of the body has at least one tab projecting axially outward from the distal end.

8. The filter element as in claim 1, wherein the geometry of the sealing member matches the geometry of the distal end of the body.

9. The filter element as in claim 5, wherein the distal end of the body has multiple slots extending axially inward from the distal end, each slot being located at a point of maximum amplitude on the distal end.

10. The filter element as in claim 1, wherein the distal end of the body has at least one slot extending axially inward from the distal end.

11. A filter module including a filter head and a canister removable connected to the head, and a filter element located within the canister, the filter element including a ring of filtration media circumscribing a central axis and defining a cavity, and an end cap at an end of the media ring; the end cap including a body defining an opening into the cavity and having a distal outer end with a repeating, undulating, non-planar geometry around the body, and further including a sealing member along a radially outer surface of the body, the sealing member also having a non-planar geometry around the distal end of the end cap body, wherein the filter head includes a diaphragm having a socket dimensioned to closely receive the annular body of the end cap, with the sealing member on the annular body providing a fluid-tight seal between the end cap and an inner surface of a wall of the socket, and wherein the socket of the diaphragm further includes an inner shoulder also with an undulating, non-planar geometry matching the geometry of the distal end of the end cap body such that the distal end of the end cap body engages in surface-to-surface relation the shoulder of the socket around the entire extent of the end cap body.

12. The filter module as in claim 11, wherein the outer, distal end of the annular body of the filter element has a series of tabs projecting axially outward from the distal end, located at points of maximum amplitude on the distal end, and the shoulder of the diaphragm socket includes corresponding slots dimensioned to receive the tabs, at corresponding points of minimum amplitude on the shoulder.

13. The filter module as in claim 11, wherein the socket has an outer wall with an axial, distal end also with an undulating, non-planar geometry matching the geometry of the shoulder and projecting an axial extent sufficient to sealingly engage the sealing member around the entire circumferential extent of the annular body of the end cap when the annular body of the end cap is received within the socket.

14. A filter module including a filter head and a canister removable connected to the head, and a filter element located within the canister,
   i) the element including a ring of filtration media circumscribing a central axis and defining a cavity, and an end cap at an end of the media ring; the end cap including a body defining an opening into the cavity and having a distal outer end with an undulating, non-planar geometry, and further including a sealing member in a groove formed in a surface of the body, the groove also having an undulating, non-planar geometry matching the non-planar geometry of the distal end of the body, and
   ii) the filter head including a diaphragm having a socket dimensioned to closely mate with the annular body of the end cap, with the sealing member on the annular body providing a fluid-tight seal between the end cap and a surface of a wall of the socket, wherein the socket of the diaphragm further includes a shoulder also with an undulating, non-planar geometry matching the geometry of the distal end of the end cap body such that the distal end of the end cap body engages in surface-to-surface relation the shoulder of the socket around the entire extent of the end cap body.

15. The filter module as in claim 14, wherein the outer, distal end of the annular body of the filter element has a series of tabs projecting axially outward from the distal end, located at points of maximum amplitude on the distal end, and the shoulder of the diaphragm socket includes corresponding slots dimensioned to receive the tabs, at corresponding points of minimum amplitude on the shoulder.

16. The filter module as in claim 14, wherein the socket has a wall with an axial, distal end also with an undulating, non-planar geometry matching the geometry of the shoulder and projecting an axial extent sufficient to sealingly engage the sealing member around the entire circumferential extent of the annular body of the end cap when the annular body of the end cap is mated with the socket.

17. A filter element including a ring of filtration media circumscribing a central axis and defining a cavity, and an end cap at an end of the media ring; the end cap including an annular body defining an opening into the cavity and having a distal outer end with a repeating, undulating, non-planar geometry, and further including a sealing member along an annular surface of the body, the sealing member also having a non-planar geometry around the distal end of the end cap body.

18. The filter element as in claim 17, wherein the undulating geometry of the sealing member has a repeating axial amplitude around the outer diameter of the body.

19. The filter element as in claim 17, wherein the geometry of the sealing member matches the geometry of the distal end of the body.

20. The filter element as in claim 18, wherein the annular surface includes a repeating, undulating groove, and the sealing member is located within the groove.

21. The filter element as in claim 1, wherein the outer distal end of the body has a smoothly undulating, non-planar geometry.

22. The filter element as in claim 21, wherein the geometry of the sealing member matches the geometry of the outer distal end of the body.

23. The filter module as in claim 14, wherein the outer distal end of the body has a smoothly undulating, non-planar geometry.

24. The filter element as in claim 17, wherein the outer distal end of the body has a smoothly undulating, non-planar geometry.

25. The filter element as in claim 24, wherein the geometry of the sealing member matches the geometry of the outer distal end of the body.

26. The filter element as in claim 25, wherein the outer distal end of the body has a generally sinusoidal shape.

27. The filter element as in claim 17, wherein the outer distal end of the body has a smoothly undulating, non-planar geometry.

28. The filter element as in claim 27, wherein the geometry of the sealing member matches the geometry of the outer distal end of the body.

29. The filter element as in claim 27, wherein the outer distal end of the body has a generally sinusoidal shape.

* * * * *